United States Patent
Demissie et al.

(10) Patent No.: US 6,777,119 B2
(45) Date of Patent: Aug. 17, 2004

(54) ACTIVELY-COOLED WATER RECOVERY IN FUEL CELL POWER PLANTS

(75) Inventors: Michael S. Demissie, Glastonburg, CT (US); Leslie L. Van Dine, Manchester, CT (US); Margaret M. Steinbugler, East Windsor, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 251 days.

(21) Appl. No.: 10/095,691

(22) Filed: Mar. 12, 2002

(65) Prior Publication Data

US 2003/0186097 A1 Oct. 2, 2003

(51) Int. Cl.$^7$ .............................. H01M 8/18; H01M 8/04
(52) U.S. Cl. ............................. 429/20; 429/24; 429/26
(58) Field of Search .............................. 429/13, 17, 20, 429/23, 24, 26, 25; 95/6

(56) References Cited

U.S. PATENT DOCUMENTS

| | | | |
|---|---|---|---|
| 6,007,931 A | * 12/1999 | Fuller et al. ................... | 429/13 |
| 6,015,634 A | 1/2000 | Bonville, Jr. et al. ......... | 429/17 |
| 6,171,718 B1 | 1/2001 | Murach et al. ............... | 429/13 |
| 6,232,006 B1 | 5/2001 | Breault ......................... | 429/26 |
| 6,274,259 B1 | 8/2001 | Grasso et al. ................. | 429/13 |
| 6,656,620 B2 * | 12/2003 | Katagiri et al. ............... | 429/26 |

* cited by examiner

Primary Examiner—Patrick Ryan
Assistant Examiner—Thomas H. Parsons
(74) Attorney, Agent, or Firm—Bachman & LaPointe, P.C.

(57) ABSTRACT

A fuel cell power plant with enhanced water recovery includes a fuel cell power plant adapted to receive a reducing fluid and an oxidant and to generate therefrom electricity and an at least partially saturated exhaust stream; a mass and energy transfer device defining a first flow passage for the wet exhaust stream and a second flow passage for an oxidant stream, the first flow passage being in mass transfer relationship with the second flow passage; and an apparatus for cooling at least one of the oxidant stream, the exhaust stream and the mass and energy transfer device, whereby water is transferred from the exhaust stream to the oxidant stream so as to produce an at least partially saturated oxidant stream. A method is also disclosed.

21 Claims, 4 Drawing Sheets

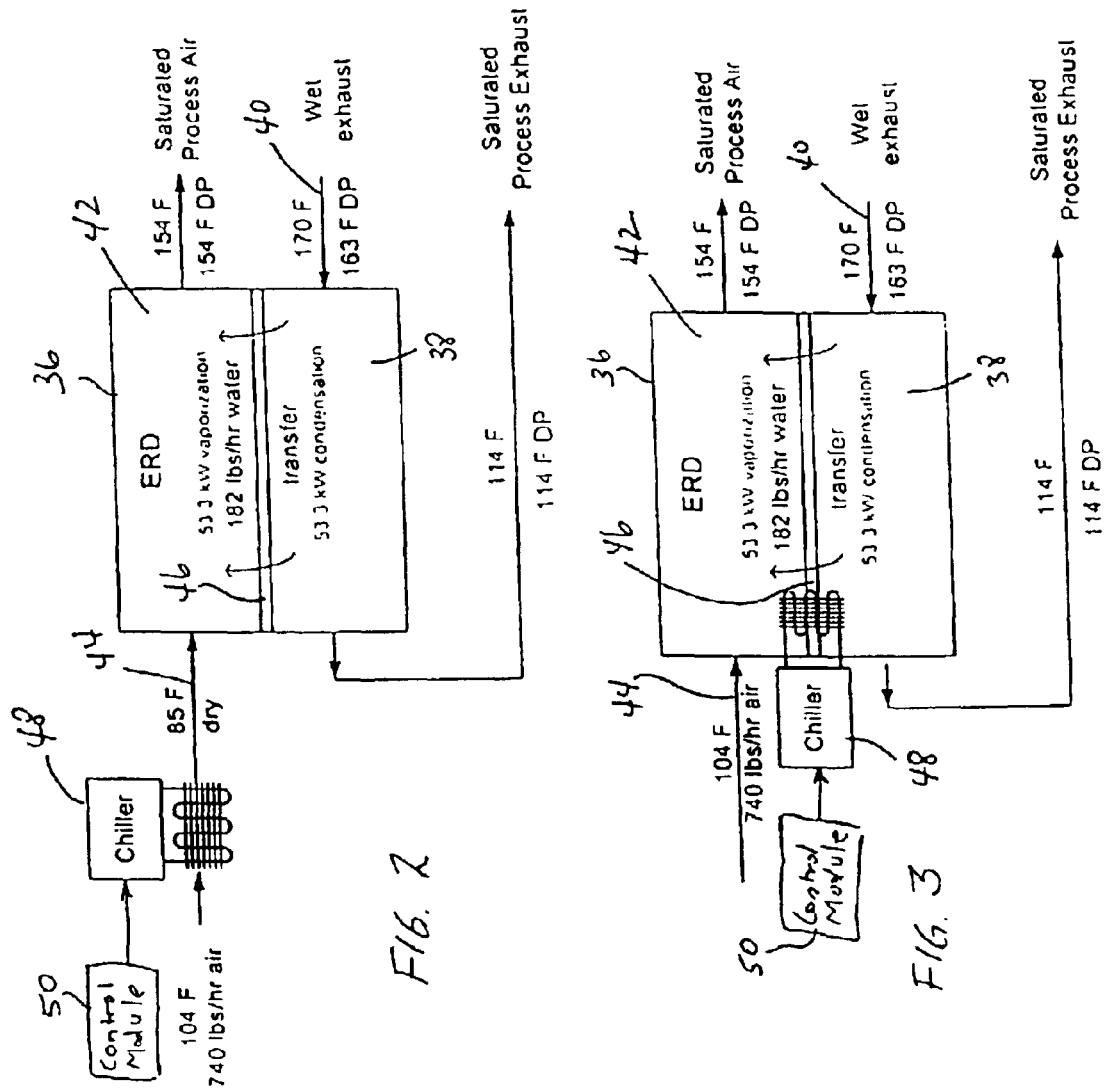

ACTIVELY-COOLED WATER RECOVERY IN FUEL CELL POWER PLANTS

BACKGROUND OF THE INVENTION

The present invention relates to the field of fuel cell power plants and, more particularly, to a method and apparatus for maintaining water balance of the power plant in a wider envelope of operating conditions.

Fuel cell power plants are well known and are commonly used to produce electrical energy from reducing and oxidizing fluids to provide electricity. In such power plants, a plurality of planar fuel cells are typically arranged in a stack surrounded by an electrically insulating frame that defines manifolds for directing flow of the reducing and oxidizing fluids, as well as coolant and product or exhaust fluids. Each individual cell generally includes an anode electrode and a cathode electrode separated by an electrolyte. A reactant or reducing fluid such as hydrogen or other hydrogen rich fuel is supplied to the anode electrode, and an oxidant such as oxygen or air, typically ambient air, is supplied to the cathode electrode.

In proton exchange membrane (PEM) fuel cells, the electrolyte is saturated with water in order to provide high ion conductivity across the membrane. Other components such as the anode electrode adjacent to the electrolyte must remain partially saturated to prevent membrane dry out from the movement of water in the cell. As the power plant is operated, however, water is formed and/or transported to the cathode and removed from the cathode, typically in the exhaust stream exiting the cathode and/or through a water transport plate as shown in commonly owned U.S. Pat. No. 5,853,909.

An operational limit on performance of a fuel cell is defined by an ability of the cell to maintain water balance as electrical current drawn from the cell into the external load circuit varies and as an operating environment of the cell varies. For proton exchange membrane (PEM) electrolyte fuel cells, if sufficient water is not returned to the anode electrode, adjacent portions of the PEM electrolyte dry out thereby decreasing the rate in which hydrogen ions may be transferred through the PEM and also resulting in crossover of the reducing fluid leading to local overheating. Similarly, if insufficient water is removed from the cathode, the cathode may become flooded effectively limiting oxidant supplied to the cathode and hence decreasing current flow. Further, if too much water is removed from the cathode in the exhaust stream, the membrane adjacent to the cathode may dry out limiting ability of hydrogen ions to pass through the PEM, thus decreasing cell performance.

When the fuel cell power plant is to be used in transportation vehicles, the problem of maintaining an efficient water balance is exacerbated as non-plant sources of water are no longer available during use, and thus, sufficient water must be retained within the plant to offset losses from reactant fluids exiting the plant. In order to operate in an acceptable manner, therefore, the plant must be operated such that water produced electrochemically at the cathode and water retained within the plant balance against water removed from the exhaust stream.

Although numerous efforts have been made to provide effective water balance, particularly in operating conditions where ambient air is used as the oxidant and is frequently available only at high temperatures, the need remains for an effective and efficient mechanism for keeping the fuel cell power plant in water balance.

It is therefore the primary object of the present invention to provide a fuel cell power plant and operating method which reliably achieve water balance at widely varying operating conditions.

Other objects and advantages of the present invention will appear hereinbelow.

SUMMARY OF THE INVENTION

In accordance with the present invention, the foregoing objects and advantages have been readily attained. According to the invention, a fuel cell power plant with enhanced water recovery is provided, which comprises a fuel cell power plant adapted to receive a reducing fluid and an oxidant and to generate therefrom electricity and an at least partially saturated exhaust stream; a mass and energy transfer device defining a first flow passage for said exhaust stream and a second flow passage for an oxidant stream, said first flow passage being in mass transfer relationship with said second flow passage; and means for cooling at least one of said oxidant stream, said exhaust stream and said mass and energy transfer device, whereby water is transferred from the exhaust stream to the oxidant stream so as to produce an at least partially saturated oxidant stream.

In further accordance with the invention, the fuel cell power plant components may be operated at pressures above ambient to further reduce the power plant's water loss in the exhaust stream. Further still the power plant can be operated such that a compressor is used to pressurize the power plant exhaust after it has passed through the mass and energy transfer device in order to enhance the water removal from the exhaust stream.

In further accordance with the invention, a method is provided for operating a fuel cell power plant, and specifically for recovering water from the exhaust stream from a fuel cell power plant, which method comprises the steps of (i) feeding a reducing fluid and an oxidant to a fuel cell power plant so as to generate electricity and an at least partially saturated exhaust stream; (ii) providing a mass and energy transfer device defining a first flow passage and a second flow passage and having a gas transfer barrier disposed therebetween; (iii) feeding said at least partially saturated exhaust stream to said first flow passage; (iv) feeding an oxidant stream to said second flow passage; and (v) cooling at least one of said oxidant stream, said exhaust stream and said mass and energy transfer device, whereby water is transferred from said at least partially saturated exhaust stream to said oxidant stream so as to produce an at least partially saturated oxidant stream.

BRIEF DESCRIPTION OF THE DRAWINGS

A detailed description of preferred embodiments of the present invention follows, with reference to the attached drawings, wherein:

FIG. 2 further illustrates a system and method in accordance with the present invention;

FIG. 3 schematically illustrates an alternative embodiment of the present invention;

DETAILED DESCRIPTION

The invention relates to fuel cell power plants and, more particularly, to a fuel cell power plant and method for operating same wherein water recovery from an at least partially saturated exhaust stream is enhanced so as to provide for enhanced water balance and energy efficiency of the plant over a wider range of operating parameters, especially temperature and particularly inlet process air temperature.

Figure 1:
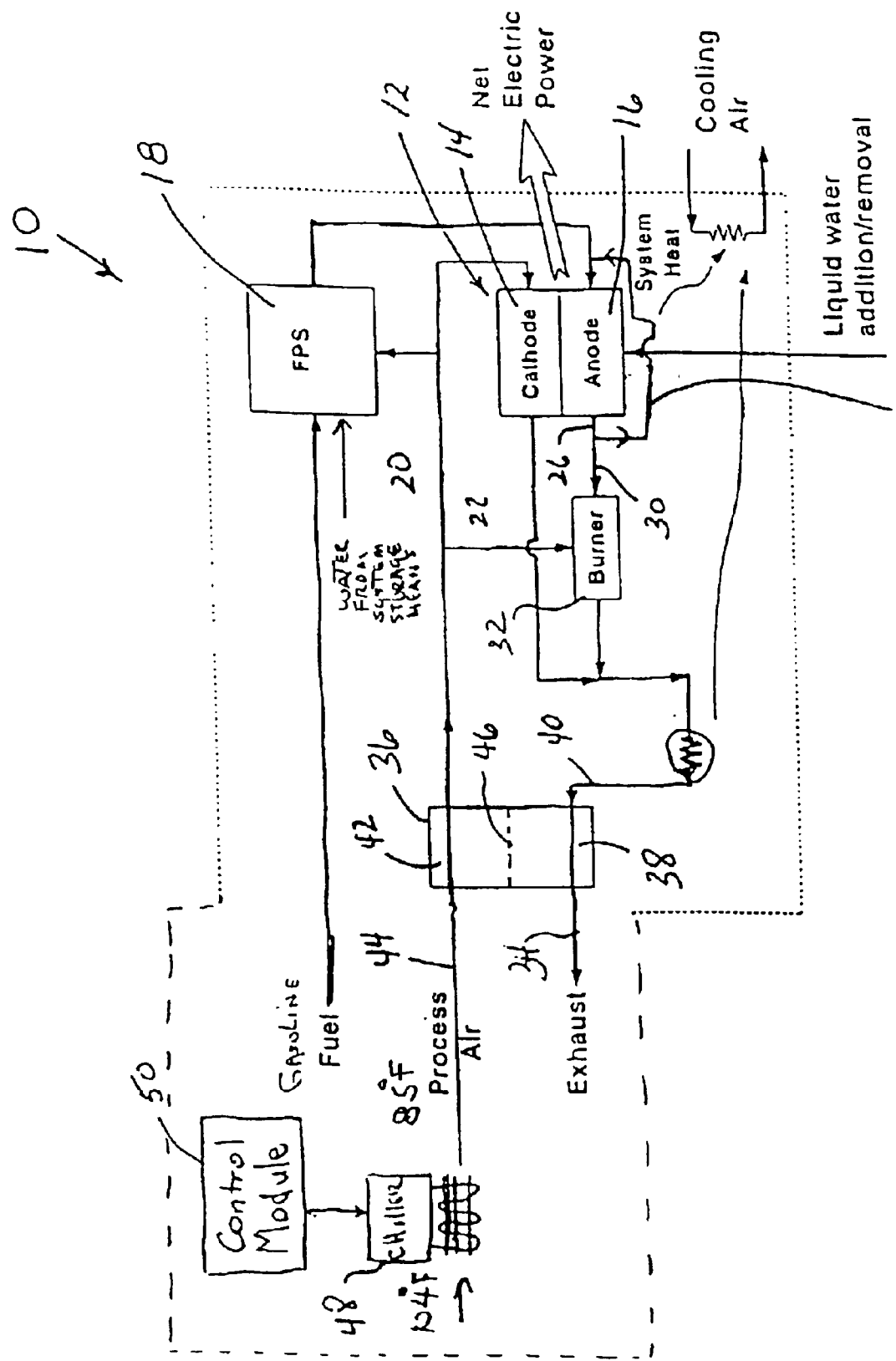
FIG. 1 schematically illustrates a fuel cell power plant with enhanced water recovery in accordance with the present invention.

FIG. 1 schematically shows a fuel cell power plant 10 which, as is well known in the art, is fed with a reducing fluid such as a hydrogen rich fuel, for example reformed gasoline or the like, and an oxidizing gas so as to generate a net electric power output and an exhaust gas stream.

Also as is well known in the art, a typical fuel cell power plant will include one or more, typically a plurality, of fuel cells each being substantially planar and typically arranged in a stack which is typically referred to as a fuel cell stack or cell stack assembly. Each fuel cell typically has an anode electrode and a cathode electrode which are separated by an electrolyte. Process air or oxidant is typically fed to the cathode electrode, while suitably prepared fuel is fed to the anode. In one type of fuel cell, the electrolyte is a proton exchange membrane (PEM), and in such a cell, hydrogen from the fuel electrochemically reacts at the anode to produce hydrogen ions and electrons. The electrons are conducted to an external load circuit and then returned to the cathode electrode, while the hydrogen ions transfer through the electrolyte to the cathode electrode, where they react with the oxidant and electrons to produce water and release thermal energy.

FIG. 1 schematically shows a single cathode 14 and a single anode 16 for simplicity.

Still referring to FIG. 1, power plant 10 further typically includes a fuel processor system 18, which is also labeled in FIG. 1 as FPS, and which is fed with a typical hydrocarbon fuel along with a portion of process air in the case of an autothermal reformer and, in this embodiment, with water removed from cell assembly 12, so as to provide a suitable fuel for anode 16 as is well known in the art.

Product from cathode 14 includes water 20 which, as shown in FIG. 1, being fed to fuel processor system 18, as well as an exhaust stream 22 which typically carries a substantial amount of water vapor. Product water 20 comes from a system storage means, not shown, in the diagram.

Product from anode 16 typically includes an exhaust gas stream 26 which also contains substantial amounts of water vapor as well as some residual combustible fuel. A portion 28 of exhaust stream 26 is typically recycled back to the fuel inlet of anode 16, as shown in FIG. 1, and portion 28 corresponds to a separated unconsumed or non-combusted portion of the fuel. A remaining portion 30 of exhaust stream 26 contains substantial amounts of water vapor as well as potentially, additional combustible fuel, and this portion 30 is fed to a burner 32 as shown along with a feed of process air so as to combust any remaining fuel within same.

As shown in FIG. 1, cathode exhaust stream 22 and portion 30 of anode exhaust following burner 32 are preferably combined and fed, for example through a heat exchanger, then through a mass and energy transfer device to an exhaust outlet 34 of power plant 10. It is water in this exhaust portion which is recovered in accordance with the present invention, and this recovery advantageously allows for maintenance of power plant water balance and efficient operation of power plant 10 as desired in accordance with the present invention.

Still referring to FIG. 1, in accordance with the present invention, a mass and energy transfer device 36 which is also referred to as an enthalpy recovery device (ERD), is provided and defines a first flow passage 38 for receiving the combined at least partially saturated exhaust stream 40 from cell assembly 12. Mass and energy transfer device 36 also advantageously defines a second flow passage for receiving process air 44, which may typically be ambient air from surrounding environmental conditions. Mass and energy transfer device 36 preferably further includes a gas transfer barrier 46 disposed between first flow passage 38 and second flow passage 42 so as to separate same while allowing and encouraging mass transfer of water from first flow passage 38 to second flow passage 42 so as to return this water to process air to be fed to power plant 10. This advantageously prevents loss of a substantial amount of water present in combined exhaust stream 40 and helps to maintain power plant water balance as desired.

One key use of fuel cell power plant 10 as shown in FIG. 1 is as a power plant for automobiles and the like, and in such applications the process air is drawn from the surrounding environment. Obviously, such conditions can include extremes such as high ambient temperatures. As set forth above, high inlet temperature of the process air can limit transfer of water vapor from the combined exhaust stream 40 into process air stream 44, and can therefore adversely impact upon recovery levels of this water. It has been found, however, in accordance with the present invention, that a fuel cell power plant 10 as shown in FIG. 1 can be provided with an enhanced range of operating capability by providing a chiller 48 or other refrigerant system which is positioned to cool at least one of process air 44, combined exhaust stream 40, and mass and energy transfer device 36. It is preferred, as will be discussed below, to cool either process air 44 or mass and energy transfer device 36, as either of these efforts can be accomplished with minimal power drain, while nevertheless providing for excellent enhancement of water transfer from combined exhaust stream 40 to process air 44 as desired.

In accordance with the present invention, it has been found that the supplemental cooling provided by chiller 48 is significantly less than cooling required to cool and condense water from the exhaust stream as is attempted in conventional methods. This is due to the fact that mass and energy transfer device 36 advantageously balances out the latent heat of condensation and vaporization across the gas transfer barrier 46. Thus, only the sensible heat balance between the exhaust stream and process air stream 44 must be addressed. This serves to significantly enhance or extend the operating range of the fuel cell system while maintaining water balance in same.

Turning to FIG. 2, the present invention is further illustrated. Mass and energy transfer device 36, labeled ERD, is shown receiving an exhaust stream at 170° F., with a 163° F. dew point, and receiving ambient air which initially is at a temperature of 104° F. Absent the benefits of the present invention, such hot dry air being fed to mass and energy transfer device 36 would not allow the fuel cell power plant to maintain water balance, resulting in membrane dry out and loss of power plant performance. By employing chiller 48 to cool the air from 104° F. to 85° F., a transfer of 182 lbs. per hour of water is affected from the exhaust stream to the incoming oxidant, so as to result in saturated processed air or oxidant provided to the fuel cell at a temperature of 154°

F. and a dew point of 154° F., while the process exhaust is reduced to 114° F. with a dew point of 114° F. This advantageously serves to provide water balance in the system, thereby advantageously allowing efficient and balanced operation of the fuel cell power plant using ambient air.

Further, it should be appreciated that chiller 48 is operated on demand when necessary. Thus, should ambient air be available at acceptable temperatures, no chilling is necessary. Thus, in further accordance with the present invention, a control module 50 is also advantageously provided, and is shown schematically in FIG. 1. Control module 50 is adapted to monitor operating conditions, for example ambient air temperature, and particularly to monitor for ambient air conditions wherein chilling is necessary, for example when ambient air temperature exceeds a known pre-selected value such as 85° F. Upon detecting such conditions, control module 50 is further adapted and programmed to operate chiller 48 to provide the desired cooling so as to maintain the fuel cell power plant in water balance. When temperature or other operating conditions return to acceptable levels, control module 50 is further adapted to stop operating chiller 48 so that the chiller is used only when needed. In this manner, additional energy is expended only when required.

In this regard, when ambient conditions reach a temperature of 104° F., a removal of approximately 1 kW of heat from mass and energy transfer device 36, either by cooling the air, the device, or the exhaust stream, in a 60 kW system, would result in thermal and water balance of the system. The electric energy required for 1 kW of cooling is about 330–500 watts, for example, for chillers with coefficient of performance of 2–3, and this energy is expended only when required.

Control module 50 may be any suitable processor, chip or the like, or any other device adapted to carry out programmed instructions, as are readily available to a person of ordinary skill in the art. Control module 50 further uses conventional equipment for monitoring operating conditions such as temperature, and is operatively associated with the chiller, for control purposes, also using conventional means.

Chiller 48 may be any suitable device for applying cooling as desired, and could utilize a small fraction of the vehicular air conditioning capacity, in such environments, if desired.

As set forth above, the selective chilling when necessary may advantageously be applied to the exhaust stream from the cell assembly 12, or to incoming oxidant, or to the mass and energy transfer device 36 itself. Turning to FIG. 3, an embodiment of the present invention is shown wherein the chiller applies cooling directly to mass and energy transfer device 36 to obtain substantially the same results as obtained with the embodiment of FIG. 2. FIG. 3 shows the same saturated exhaust and hot air entering mass and energy transfer device 36, with cooling being applied to device 36, such that 182 lbs. per hour of water are transferred from the exhaust to the incoming air stream so as to provide saturated or at least partially saturated process air to the fuel cell having a temperature of 154° F. and a dew point of 154° F., while reducing the temperature and dew point of the process exhaust stream to 114° F., thereby providing water balance as desired.

Gas transfer barrier 46 in accordance with the present invention is preferably a fine pore enthalpy exchange barrier such as that disclosed in commonly owned U.S. Pat. No. 6,274,259, which is incorporated herein by reference.

It should also be noted that the exhaust stream passed to mass and energy transfer device 36 in accordance with the present invention includes at least the exhaust from cathode 14, and preferably the exhaust from anode 16 as well. In a gasoline fueled power plant, which is one of the most difficult system in which to maintain water balance, anode recycle is also preferably used and can result in anode hydrogen utilization of approximately 90%, and oxygen utilization of approximately 65%. Such utilization levels are important factors and impact upon the water balance limit. Further, higher degrees of utilization of hydrogen and oxygen help raise the water balance temperature limit by reducing the mass flow containing water vapor exiting the power plant. Thus, it is preferred that anode exhaust be recycled as shown in FIG. 1 so as to obtain the desired high levels of hydrogen utilization, and that the remaining exhaust from the anode be combined with cathode exhaust as well to form the combined at least partially saturated exhaust stream to be treated in mass transfer device 36 as desired.

In further accordance with the present invention, water recovery can be enhanced by pressurizing power plant components downstream of the ERD inlet feed and upstream of the exhaust stream of the fuel cell power plant.

Figure 4:
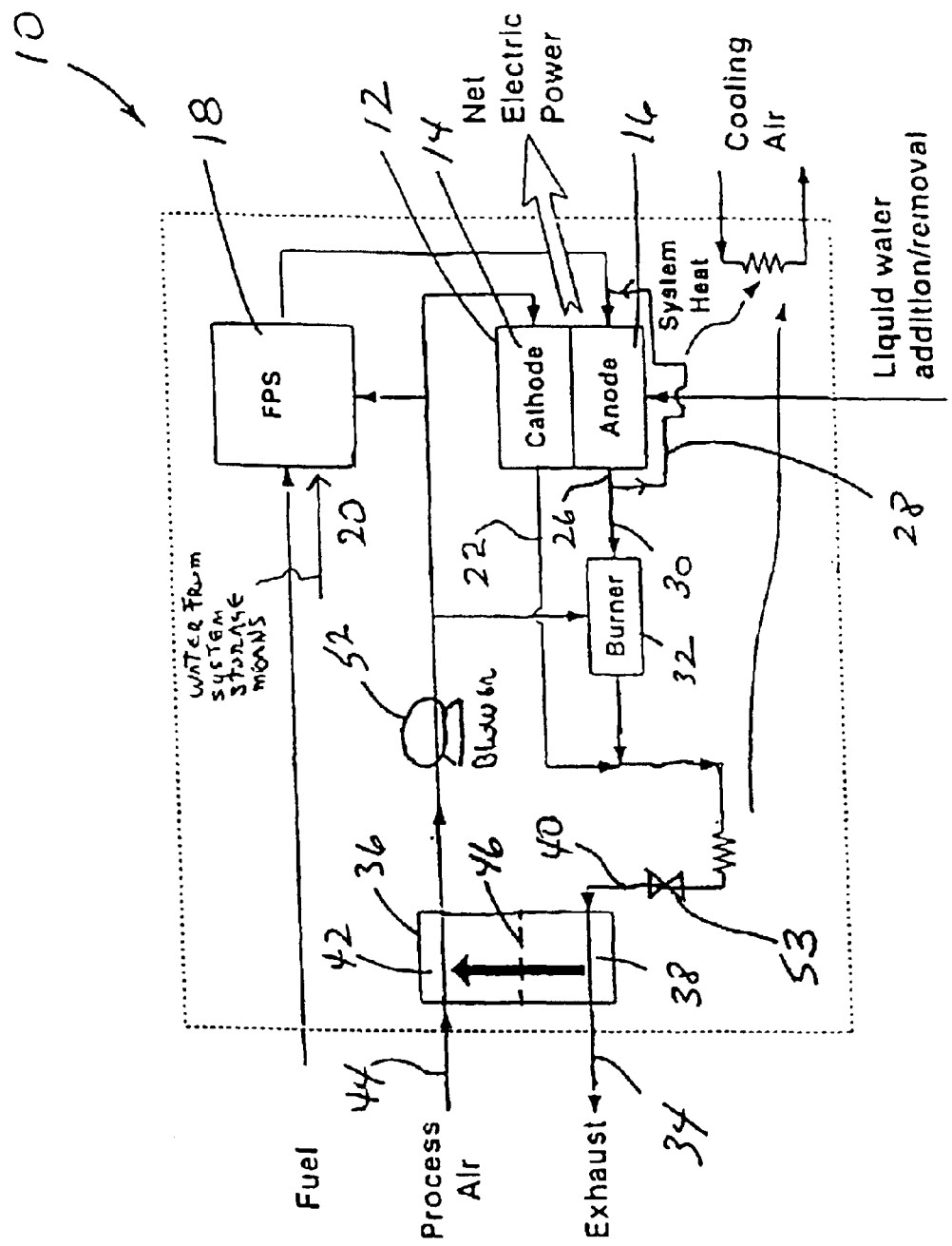
FIG. 4 schematically illustrates a further alternative of the present invention wherein water recovery is further enhanced by increasing power plant pressure, excluding the mass and energy transfer device.

FIG. 4 shows an embodiment of the present invention wherein a compressor 52 and pressure control valve 53 are provided, in this case to increase pressure of process air 44 being delivered to cathode 14 through various components and to the exhaust, such that water condensation within fuel cell assembly 12 is encouraged and water exiting fuel cell assembly 12 is reduced, thereby relieving mass and energy transfer device 36 of a portion of the burden of water recovery. As with the chiller 48 of FIGS. 1–3, compressor 52 and valve 53 may advantageously be operatively associated with a control module such as control module 50 in FIG. 1 and operated when operating conditions dictate, so as to assist in keeping power plant 10 in water balance at high temperatures. In this embodiment, compressor 52 may be a blower or any other conventional equipment which would be readily available to a person of ordinary skill in the art, and it may be desirable to increase pressure downstream of compressor 52 to a pressure of, preferably, at least about 15.696 psia, and preferably to a pressure of at least about 22.85 psia. Higher pressures may be acceptable but usually require added energy input that would reduce overall power plant efficiency.

Figure 5:
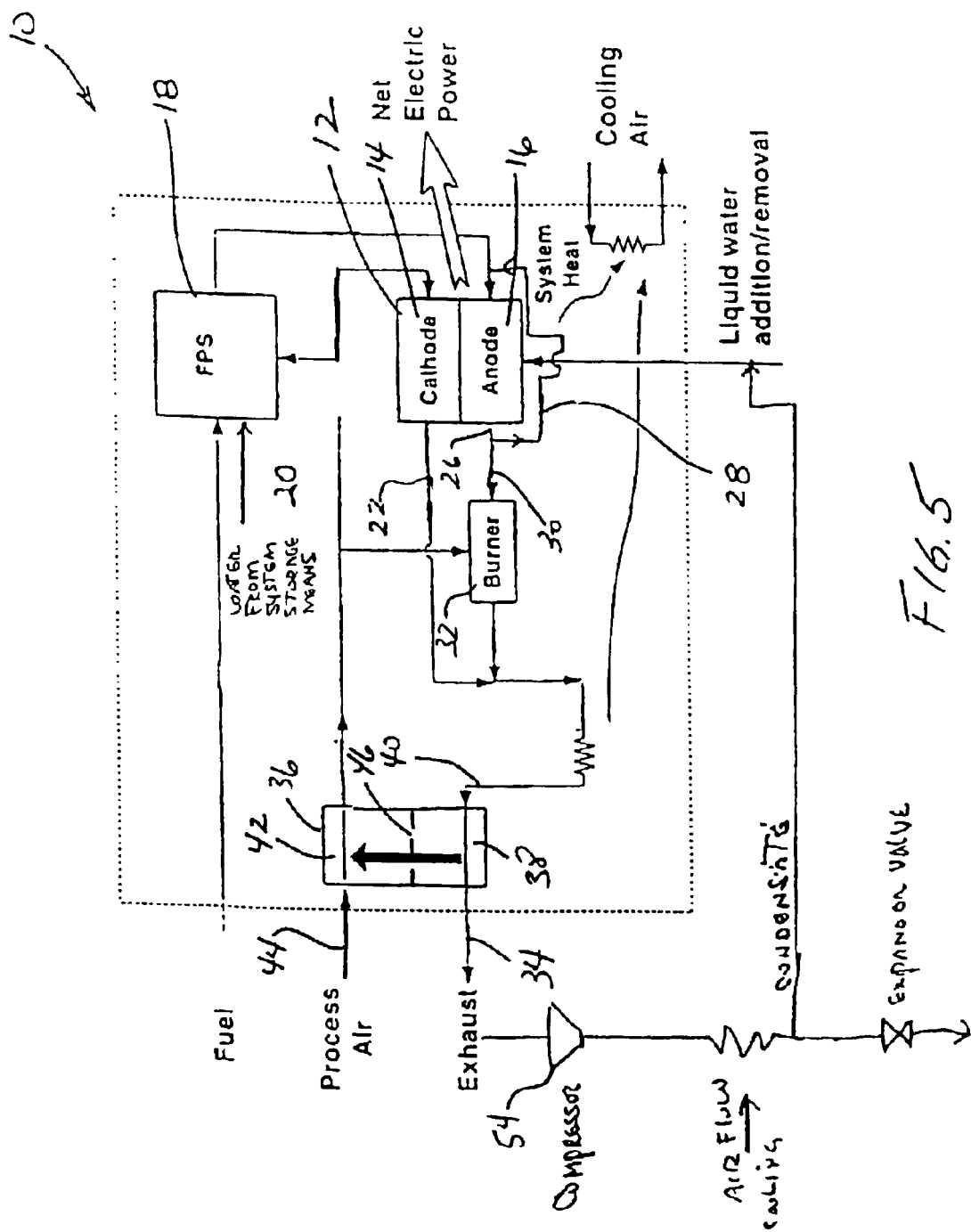
FIG. 5 schematically illustrates a further alternative embodiment of the present invention wherein water recovery is further enhanced by compressing the plant exhaust stream downstream of the mass transfer device.

Turning to FIG. 5, a further alternative embodiment of the present invention is illustrated wherein compressor 54 is positioned to treat exhaust from mass transfer device 36 such that additional water is removed from this stream. By removing additional water downstream of mass and energy transfer device 36, a portion of the burden on this device is removed as in the embodiment of FIG. 4, thereby allowing for operation of power plant 10 in a wider range of operating conditions as desired. As with compressor 52 and chiller 48, compressor 54 can likewise be operatively associated with a control module such as control module 50 of FIG. 1 so as to be selectively operated only when operating conditions dictate.

Alternatively, incorporating compressor 54 and/or compressor 52 into power plant 10 in accordance with the present invention can advantageously allow for reduction in size of the mass transfer device, which is also desirable since space in such devices is always a concern.

In accordance with the present invention, it should be readily appreciated that a system and method have been provided whereby fuel cell power plants can be operated at a wider range of operating conditions, and especially at higher temperatures for incoming process air or oxidant.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A fuel cell power plant with enhanced water recovery, comprising:
   a fuel cell power plant adapted to receive a reducing fluid and an oxidant and to generate therefrom electricity and an at least partially saturated exhaust stream;
   a mass and energy transfer device defining a first flow passage for said exhaust stream and a second flow passage for an oxidant stream, said first flow passage being in mass transfer relationship with said second flow passage; and
   means for cooling at least one of said oxidant stream, said exhaust stream and said mass and energy transfer device, whereby water is transferred from said exhaust stream to said oxidant stream so as to produce an at least partially saturated oxidant stream, wherein said means is a chiller for cooling at least one of said oxidant stream, said exhaust stream and said mass and energy transfer device.

2. The apparatus of claim 1, wherein said means further comprises means for increasing pressure of said oxidant stream and said exhaust stream.

3. The apparatus of claim 1, further comprising a control module adapted to monitor operating conditions in which said means for cooling is needed, and to selectively operate said means for cooling when said operating conditions are detected, whereby said cooling means is selectively used when needed.

4. The apparatus of claim 3, wherein said operating conditions comprise temperature of said oxidant stream, and wherein said control module is programmed to selectively operate said means when said temperature is greater than a known pre-selected temperature.

5. The apparatus of claim 1, wherein said mass and energy transfer device is associated with said fuel cell power plant so as to feed said at least partially saturated oxidant stream to said fuel cell power plant as said oxidant.

6. The apparatus of claim 1, wherein said means comprises means for cooling said oxidant stream.

7. The apparatus of claim 1, wherein said fuel cell power plant has at least one anode and at least one cathode each having an inlet and an outlet, and wherein at least said outlet of said cathode is connected with said mass and energy transfer device to convey said exhaust stream to said first flow passage.

8. The apparatus of claim 7, wherein said outlet of said cathode and said outlet of said anode are connected with said mass and energy transfer device to convey said exhaust stream to said first flow passage.

9. The apparatus of claim 7, wherein said mass and energy transfer device is associated with said fuel cell power plant so as to convey said oxidant stream as oxidant to said cathode.

10. A mass transfer device, comprising:
    a housing defining a first flow passage for a first gas stream, and a second flow passage for a second gas stream, said first flow passage being in mass transfer relationship with said second flow passage;
    means for cooling at least one of said first gas stream, said second gas stream and said housing, whereby water is transferred from said first stream to said second stream, wherein said means is a chiller for cooling at least one of said oxidant stream, said exhaust stream and said mass and energy transfer device; and
    a control module adapted to detect operating conditions in which said means is needed, and to selectively operate said means when said operating conditions are detected, whereby said means is selectively used when needed.

11. The apparatus of claim 10, wherein said operating conditions comprise temperature of said second gas stream, and wherein said control module is programmed to selectively operate said means when said temperature is greater than a known pre-selected value.

12. A method for recovering water from an exhaust stream of a fuel cell power plant, comprising the steps of:
    (i) feeding a reducing fluid and an oxidant to a fuel cell power plant so as to generate electricity and an at least partially saturated exhaust stream;
    (ii) providing a mass and energy transfer device defining a first flow passage and a second flow passage, said first flow passage being in mass transfer relationship with said second flow passage;
    (iii) feeding said exhaust stream to said first flow passage;
    (iv) feeding an oxidant stream to said second flow passage; and
    (v) cooling at least one of said oxidant stream, said exhaust stream and said mass and energy transfer device with a chiller, whereby water is transferred from said exhaust stream to said oxidant stream so as to produce an at least partially saturated oxidant stream.

13. The method of claim 12, further comprising the steps of detecting operating conditions in which step (v) is needed, and selectively performing said step (v) when said operating conditions are detected.

14. The method of claim 13, wherein said operating conditions comprise temperature of said oxidant stream, and wherein said selectively performing step comprises selectively performing said step (v) when said temperature is greater than a known pre-selected value.

15. The method of claim 12, further comprising feeding said at least partially saturated oxidant stream to said fuel cell power plant as said oxidant.

16. The method of claim 12, wherein said fuel cell power plant has at least one anode and at least one cathode each having an inlet and an outlet, and wherein at least said outlet of said cathode is connected with said mass transfer device to convey said exhaust stream to said first flow passage.

17. The method of claim 16, wherein said outlet of said cathode and said outlet of said anode are connected with said mass and energy transfer device to convey said exhaust stream to said first flow passage.

18. The method of claim 12, wherein said step (v) comprises cooling said oxidant stream.

19. A fuel cell power plant with enhanced water recovery, comprising:
    a fuel cell power plant adapted to receive a reducing fluid and an oxidant and to generate therefrom electricity and an at least partially saturated exhaust stream;
    a mass and energy transfer device defining a first flow passage for said exhaust stream and a second flow passage for an oxidant stream, said first flow passage being in mass transfer relationship with said second flow passage; and
    means for cooling said oxidant stream upstream of said mass and energy transfer device whereby water is transferred in said mass and energy transfer device from said exhaust stream to said oxidant stream so as to produce an at least partially saturated oxidant stream.

20. A mass transfer device, comprising:

a housing defining a first flow passage for a first gas stream, and a second flow passage for a second gas stream, said first flow passage being in mass transfer relationship with said second flow passage;

means for cooling at least one of said first gas stream and said second gas stream upstream of said housing, whereby water is transferred in said housing from said first stream to said second stream; and a control module adapted to detect operating conditions in which said means is needed, and to selectively operate said means when said operating conditions are detected, whereby said means is selectively used when needed.

21. A method for recovering water from an exhaust stream of a fuel cell power plant, comprising the steps of:

(i) feeding a reducing fluid and an oxidant to a fuel cell power plant so as to generate electricity and an at least partially saturated exhaust stream;

(ii) providing a mass and energy transfer device defining a first flow passage and a second flow passage, said first flow passage being in mass transfer relationship with said second flow passage;

(iii) feeding said exhaust stream to said first flow passage;

(iv) feeding an oxidant stream to said second flow passage; and (v) cooling said oxidant stream upstream of said mass and energy transfer device whereby water is transferred in said mass and energy transfer device from said exhaust stream to said oxidant stream so as to produce an at least partially saturated oxidant stream.

* * * * *